June 2, 1964 P. E. HIXON ETAL 3,135,188
FILM CARRYING RACK
Filed Feb. 20, 1963 6 Sheets-Sheet 1

INVENTORS
Philip E. Hixon,
Elmer E. White &
Marvin B. Fleisher
BY Sherman & Sherman
ATTORNEYS June 2, 1964  P. E. HIXON ETAL  3,135,188
FILM CARRYING RACK Filed Feb. 20, 1963  6 Sheets-Sheet 2

INVENTORS
Philip E. Hixon,
Elmer E. White &
Marvin B. Fleisher

BY Sherman & Sherman
ATTORNEYS

June 2, 1964  P. E. HIXON ETAL  3,135,188
FILM CARRYING RACK
Filed Feb. 20, 1963  6 Sheets-Sheet 3
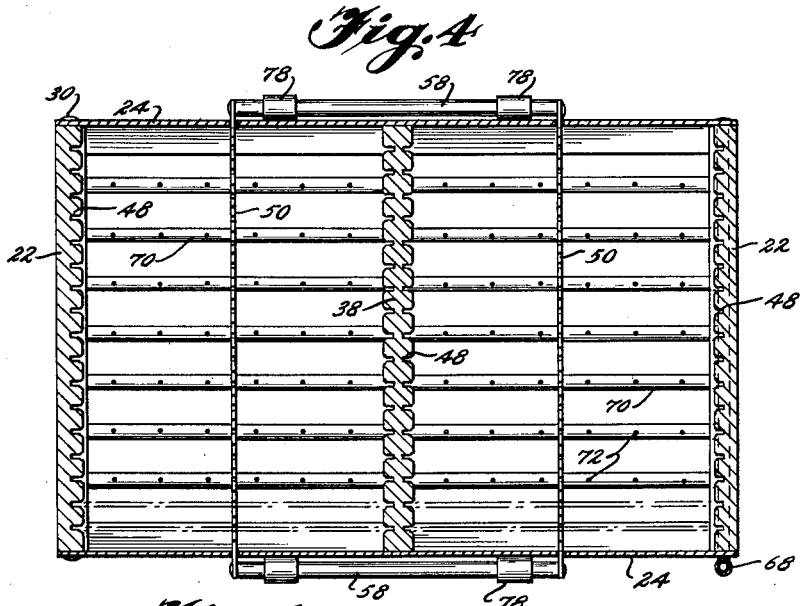
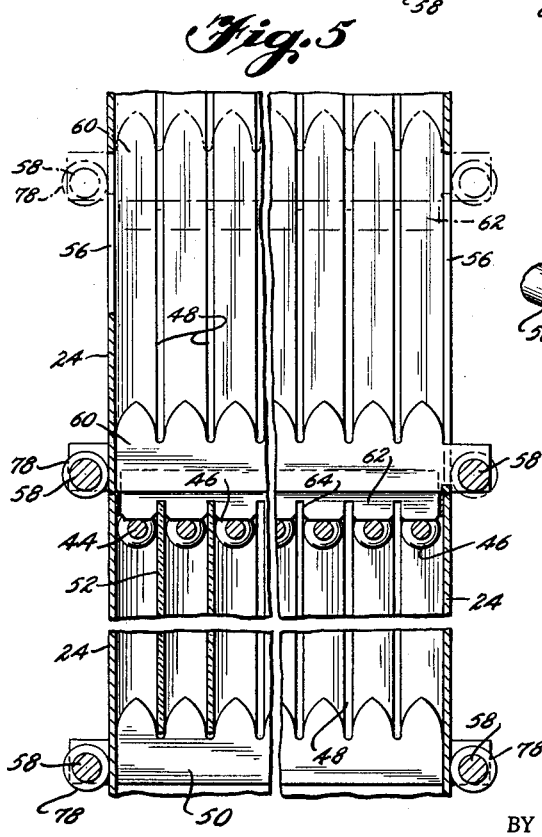
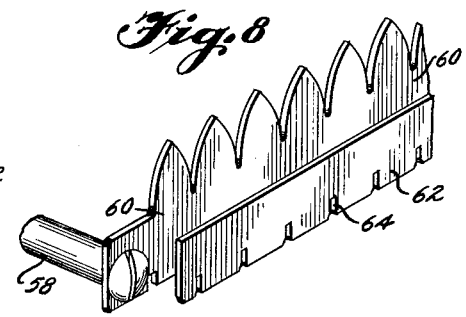
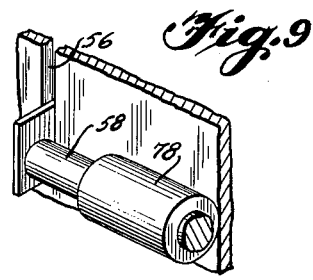
INVENTORS
Philip E. Hixon,
Elmer E. White &
Marvin B. Fleisher
BY Sherman & Sherman
ATTORNEYS

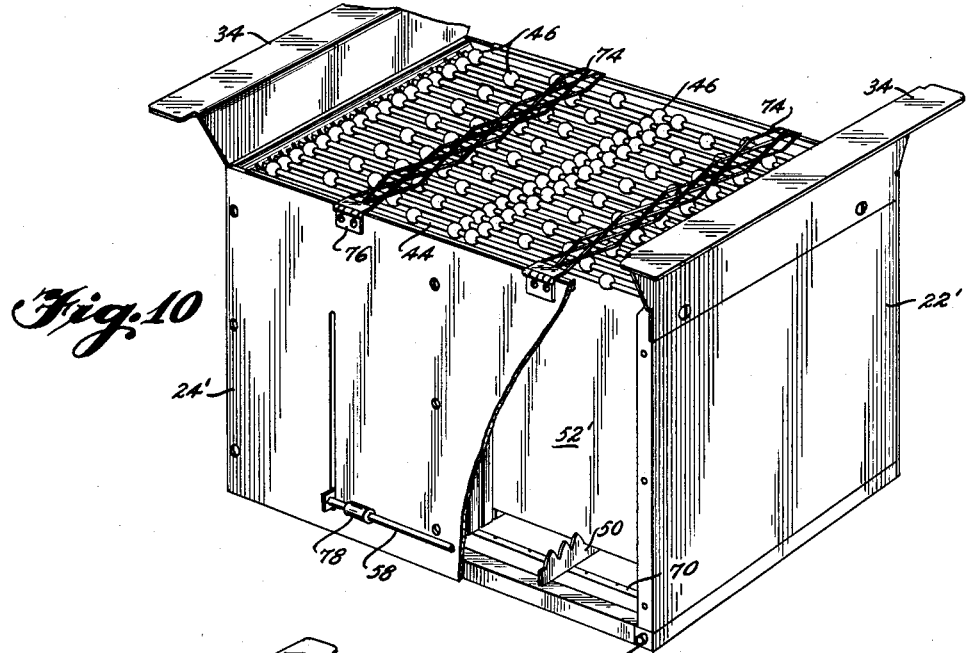
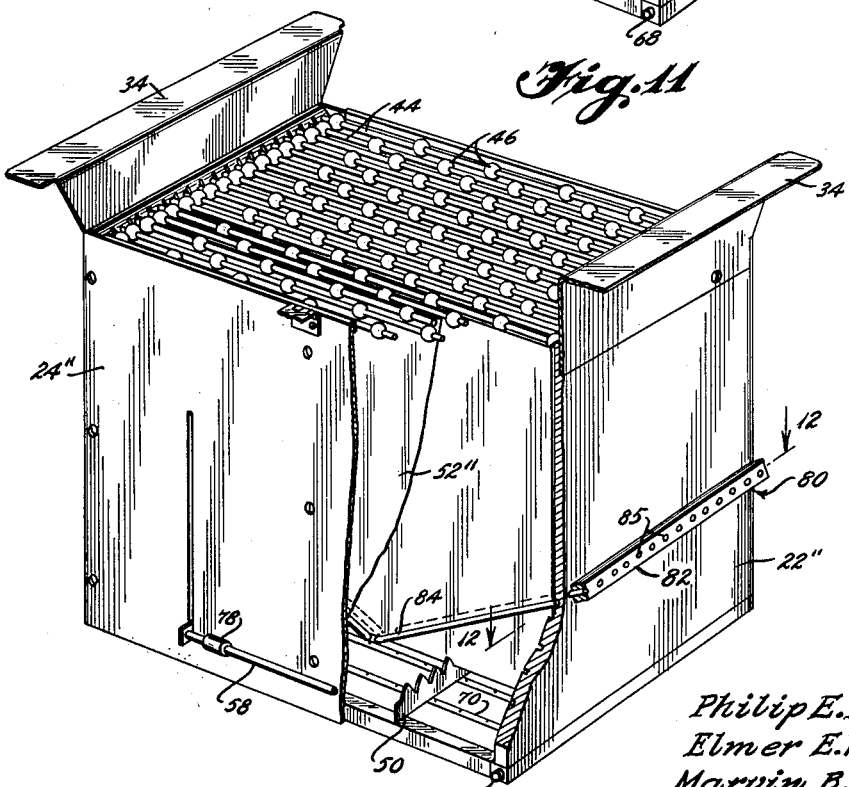

June 2, 1964   P. E. HIXON ETAL   3,135,188
FILM CARRYING RACK
Filed Feb. 20, 1963   6 Sheets-Sheet 5
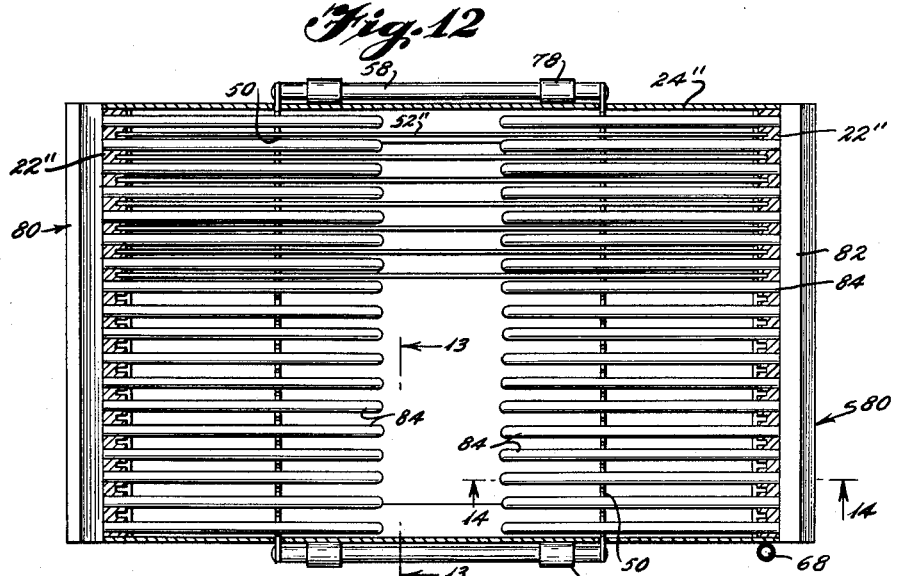
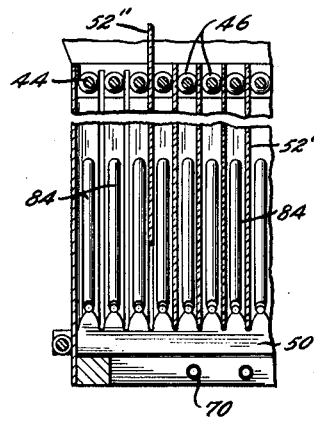
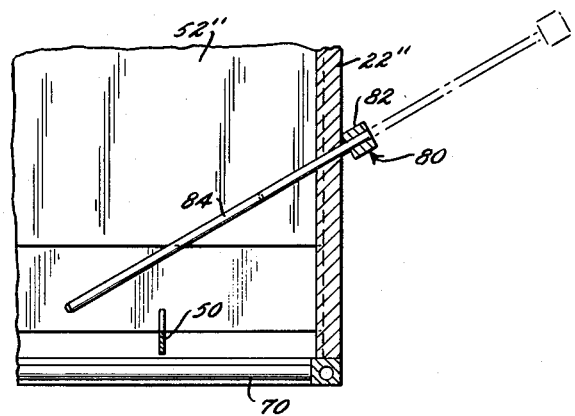
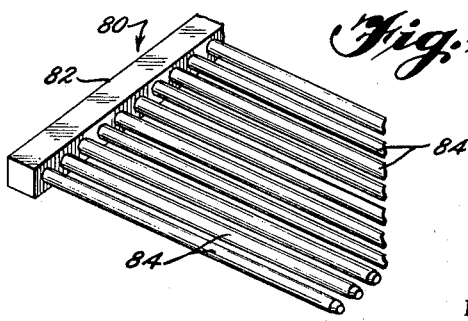
INVENTORS
Philip E. Hixon,
Elmer E. White &
Marvin B. Fleisher
BY Sherman & Sherman
ATTORNEYS June 2, 1964 P. E. HIXON ETAL 3,135,188
FILM CARRYING RACK
Filed Feb. 20, 1963 6 Sheets-Sheet 6

INVENTORS
PHILIP E. HIXON,
ELMER E. WHITE 2nd
MARVIN B. FLEISHER
BY Sherman and Sherman
ATTORNEY United States Patent Office 3,135,188
Patented June 2, 1964

3,135,188
FILM CARRYING RACK
Philip E. Hixon, Wantagh, Elmer E. White, West Hempstead, and Marvin B. Fleisher, Jericho, N.Y., assignors to Rolor Corporation, Syosset, N.Y., a corporation of New York
Filed Feb. 20, 1963, Ser. No. 259,825
28 Claims. (Cl. 95—98)

The present invention relates to a receptacle or carrying basket for use in handling photographic prints, hereinafter referred to as a film carrying rack, and relates more particularly to a film carrying rack for cut photographic color film. More specifically, the present invention relates to a transparent film carrying rack which allows for reversal exposure of the film while retained within the film carrying rack.

This application is a continuation-in-part of our copending application Serial No. 179,301, entitled Film Carrying Rack, filed March 13, 1962, now abandoned, and the subject matter of said application is incorporated herein by reference. Various attempts have been made in the prior art to provide a satisfactory photographic film carrying rack. However, prior racks have had various disadvantages, as a result of which they have not gained wide acceptance. One disadvantage is that the known racks are not transparent and do not permit re-exposure of the reversible color film within the rack. Another disadvantage of known racks is the prevention of proper gas burst agitation, inasmuch as the bottoms of the racks have restricted or small openings. Furthermore, the drainage of known racks is poor and it has not been possible to completely dry film within the rack itself. As a consequence, it has not been possible to obtain, with any degree of consistency, color print reproductions of high quality at low cost.

It has now been found that the disadvantages of the prior art film carrying racks can be avoided by constructing film carrying racks in a novel manner not suggested heretofore.

In accordance with this invention, the film carrying rack is constructed of transparent materials such as glass, transparent polyamides, polyesters, polyolefins, polyacrylics, polymerized modified acrylics (generally known as modacrylics), polyvinyls, and the like transparent synthetic resins. Preferably, the material employed should have a negligible adhesive affinity for liquids so that liquid carry-over, due to surface tension, is reduced to a minimum. Moreover, the synthetic resin material employed should be inert to chemicals employed in color print processing. Such a property, together with its low affinity for liquids, makes it possible for water and other liquids to flow rapidly from the rack of this invention.

Moreover, the film carrying rack of this invention is constructed and arranged so that a guide means is provided at the top of the rack to facilitate loading the film to be processed therein. Said guide means may be formed of conventional solid circular rods. However, other types of rods, such as those elliptical, triangular, or polygonal in shape, may be employed. A preferred embodiment comprises guide rods provided with a plurality of small spacer elements such as spherical beads which are effective in reducing the contact area between the prints and the upper support means. The use of such spacer elements to position the prints away from the support rods also obviates the problem of developing solution holdup referred to above.

The present invention also utilizes removable comb-like guide members for facilitating alignment of large size prints into appropriate grooves in the adjustable bottom film support member. Each guide member is inserted through appropriate apertures in one side of the rack, and after the prints are properly seated, is removed before the developing processes proceed further.

Another feature of this invention resides in the provision of improved securing means for securing the adjustable bottom film support member in its elevated position so that developed prints may be readily removed from the rack.

Accordingly, it is a primary object of this invention to provide a novel film carrying rack which avoids the disadvantages of prior art film carrying racks.

Another object of this invention is to provide a film carrying rack which facilitates loading and unloading of film from the rack.

Still another object of this invention is the provision of improved film spacing means for a film carrying rack.

A further object of this invention is to provide a film carrying rack with a removable film guide adjacent to the bottom of the rack.

It is a further object of this invention to provide a novel film carrying rack which allows for better agitation and distribution of developing solution within the rack.

A still further object of this invention is to provide a film carrying rack which is adapted to receive film of different sizes.

The above and other objects, features and advantages of this invention will become more apparent from the following description and the appended claims.

In the drawings, wherein preferred embodiments of this invention are shown,

FIGURE 4 is a horizontal cross-sectional view taken along the line 4—4 of FIGURE 1, showing the position of the adjustable bottom film support;

FIGURE 5 is a vertical cross-sectional view taken substantially along the line 5—5 of FIGURE 2, with the elevated position of the bottom film support for the top deck of the double-deck film rack being shown in dot-dash lines;

FIGURE 8 is a perspective view of a portion of a member which functions simultaneously as a bottom film support for the film in the top deck and as the upper edge support for film in the lower deck;

FIGURE 9 is a perspective view of a friction roller associated with the adjustable bottom film support;

FIGURE 10 is a perspective view of another embodiment in accordance with the present invention with parts thereof broken away for the sake of clarity;

FIGURE 11 is a perspective view of a film carrying rack in accordance with another embodiment of the present invention, which rack is intended for the reception of large size prints, with parts thereof broken away;

FIGURE 12 is a horizontal sectional view taken along line 12—12 of FIGURE 11 showing removable comb-like film guide members in operative positions;

FIGURE 13 is a partial sectional view taken along line 13—13 of FIGURE 12 showing a section of one of the removable guide members in greater detail;

FIGURE 14 is a partial sectional view taken along line 14—14 of FIGURE 12 with dot-dash lines indicating that the removable film guide member may be retracted;

FIGURE 15 is a perspective view of a portion of a removable film guide member of the FIGURE 12 embodiment.

Like reference numerals indicate like parts throughout the several views of the drawings.

Figure 1:
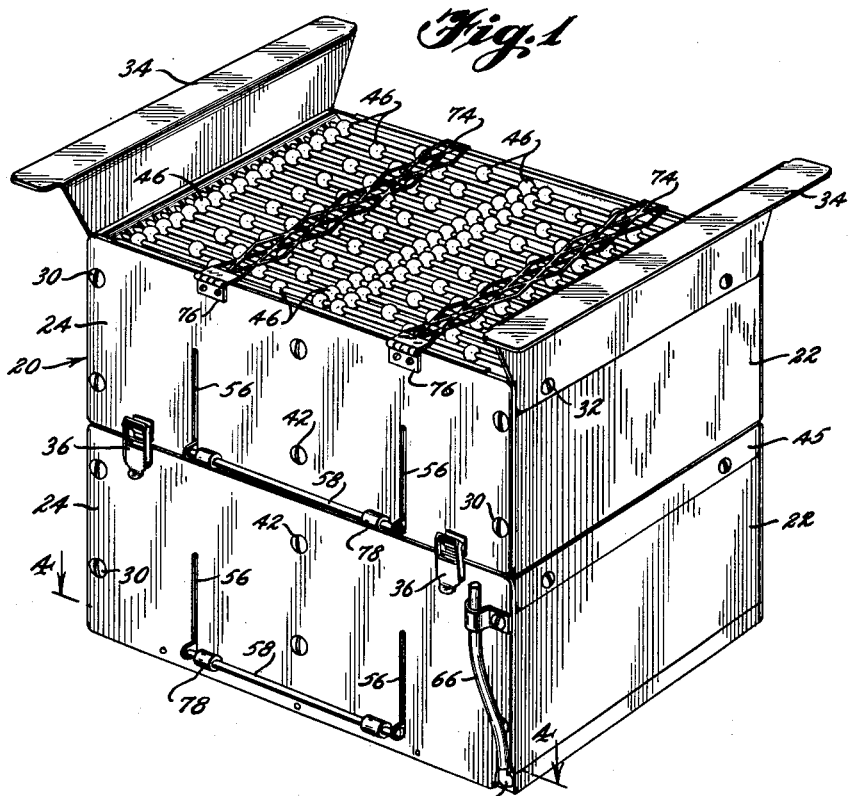
FIGURE 1 is a perspective view of a double-deck photographic film carrying rack in accordance with this invention.

Referring now to the drawing, and more particularly to FIGURE 1, reference numeral 20 generally designates a double-deck film carrying rack which is suitable for use in the treatment and transportation of relatively small, standard size photographic film prints such as 2¼ x 3¼ inches, 4 x 5 inches, and the like.

This film carrying rack comprises substantially identical upper and lower decks, each of which includes a pair of end walls 22 and a pair of side walls 24. Walls 22 and 24 are preferably of a material which has negligible adhesive affinity for the liquids used as the developing solutions so that liquid carry-over from one solution tank to the next, due to surface tension, is reduced to a minimum. Moreover, the materials employed should be inert to the chemicals employed in the developing solutions. At least parts of walls 22 and 24 are transparent so that the film may be subject to reversal exposure by light penetrating through the rack. Relatively little light is required for the desired reversal exposure. Consequently, the term "transparent" is intended to encompass all materials which exhibit a sufficient degree of translucency or transparency for the above-mentioned function. In accordance with the preferred embodiment, walls 22 are made of Plexiglas and walls 24 are stainless steel. It is also within the purview of the present invention to construct all parts of the rack of transparent material.

Figures 6, 7:
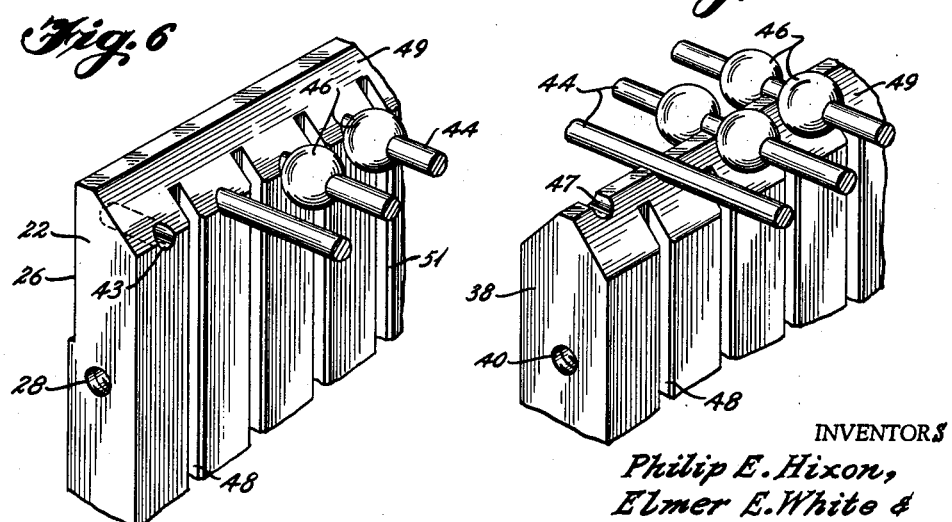
FIGURE 6 is a perspective view of a portion of an end wall provided with film-receiving grooves showing how the film support rods are mounted.
FIGURE 7 is a perspective view of a section of the center plate of the film carrying rack.

As clearly shown in FIGURE 6, the lateral edges of walls 22 are provided with suitable threaded bores 28 for the reception of bolts 30 which fasten side walls 24 into an integral assembly with end walls 22. Bolts 32 fasten a pair of handles 34 to the upper deck of the film carrying rack. As shown in FIGURE 6, walls 22 may be provided with recessed portions 26 adapted to receive the depending portions of handles 34. The handles have upper horizontal portions adapted to be grasped for ready insertion and removal of the film carrying rack from the developing tanks.

Figure 2:
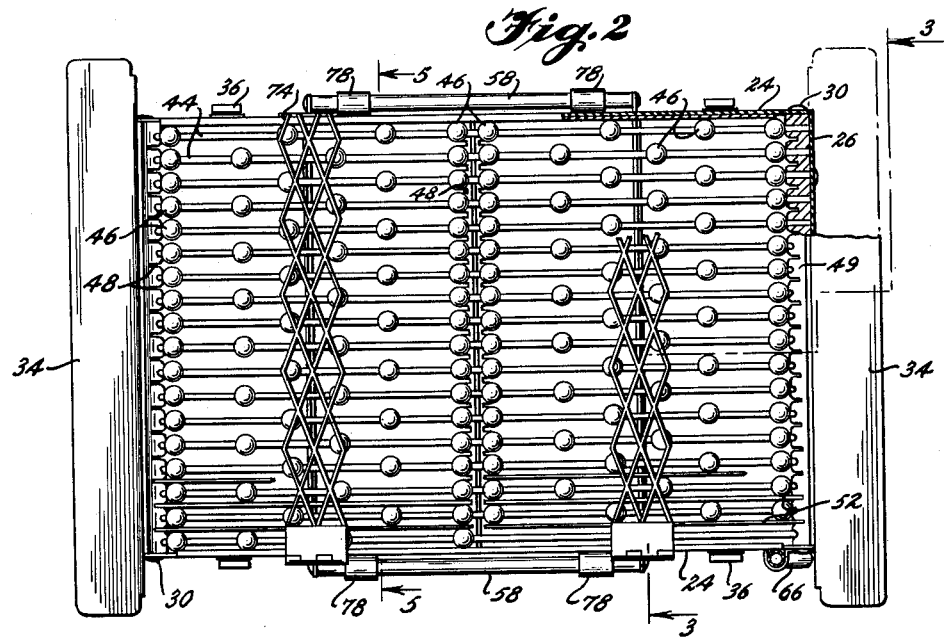
FIGURE 2 is a top view of the embodiment of FIGURE 1, shown partly in section.

As is clearly shown in FIGURES 1 and 2, two catches 36 are provided on each side of the rack to fasten the upper and lower decks to each other. It is to be understood that decks of various sizes may be interconnected by such catches. Obviously, additional decks may be added in a similar manner. It will be appreciated that any suitable type of fastening means may be employed to interconnect the upper and lower decks with each other.

Each deck is subdivided into two print-receiving sections by a central wall 38, shown in FIGURES 2, 4 and 7. Threaded bores 40 are provided at each end of the central wall 38 for reception of bolts 42 to rigidly connect the central wall to side walls 24.

A plurality of longitudinally extending rods 44 are secured adjacent the upper edges of end walls 22 and central wall 38 in any appropriate manner. By way of illustration, FIGURE 6 shows that bores 43 are provided in end walls 22 for receiving the ends of rods 44. Bores 43 of the upper deck are closed off on the outside by the depending side of handles 34. Similarly, the bores 43 of the lower deck are closed off by a thin bar 45. As shown in FIGURE 7, rods 44 are centrally supported in indentations 47 in the upper edge of central wall 38. The rods are provided with spacer beads 46 which are preferably made of a transparent material. In the preferred embodiment, rods 44 are made of light metal, however, these rods may also be of transparent material. End walls 22 and central wall 38 contain aligned, vertical grooves or slots 48, as are clearly shown in FIGURES 6 and 7. Slots 48 serve to frictionally support the edges of the film and may be ⅟₁₆ inch in width and ³⁄₁₆ inch in depth in the case of 4 x 5 inch film, although these measurements are given by way of illustration only. End walls 22 and central wall 38 have upper surfaces 49 inclined towards slots 48 to minimize the possibility of bending or otherwise damaging the prints during insertion. For a similar reason, the slots 48 may have beveled edges 51. The grooves should be large enough to readily accommodate and guide the prints being handled, and yet should be small enough to effect a straightening and holding action on wet prints. The minimum space between beads 46 on adjacent rods 44 substantially corresponds to the width of slots 48. Beads 46 are thus effective in guiding photographic prints which are being inserted into the appropriate slots 48. The exact configuration of beads 46 is not critical. However, the configuration and the spacing of the beads should be selected to minimize contact with the prints. After the film has been inserted, beads 46 are effective in spacing the prints from rods 44, thereby insuring better distribution of the developing solution throughout the rack since holdup of solution between the underside of the rods and the adjacent portion of the films is prevented.

Figure 3:
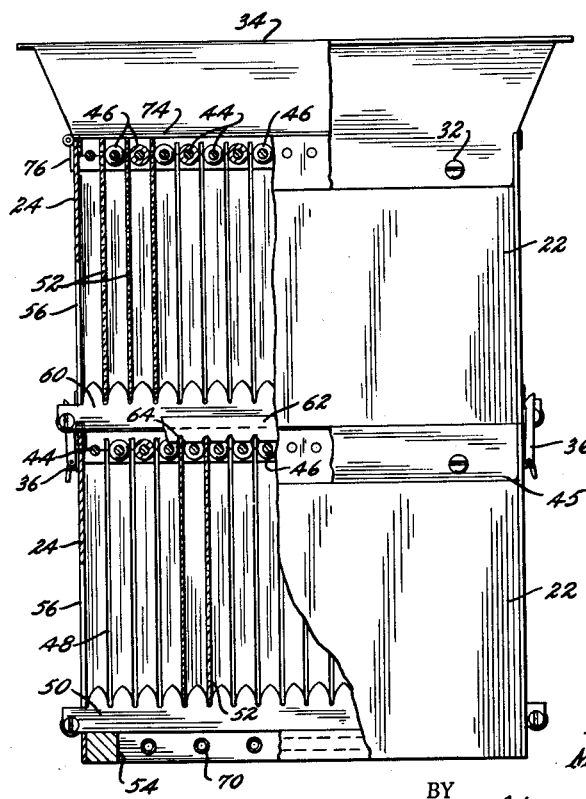
FIGURE 3 is a partial elevational, partial cross-sectional view taken along the line 3—3 of FIGURE 2.

FIGURE 3 illustrates the support means for the lower edges of the prints in the two decks of film carrying rack 20. The support means for the lower deck comprise a pair of serrated supporting strips 50 having serrations of a size to accommodate the bottom edges of prints 52, two of which are shown in FIGURE 3. Normally, supporting strips 50 rest upon a suitable frame 54 which is connected to the lower edges of walls 22, 24 in any appropriate manner. The ends of supporting strips 50 project through vertical slots 56 provided in side walls 24 and are joined by a handle 58. Supporting strips 50 and handle 58 may preferably be made of a synthetic resinous substance which is inert to the developing solutions and is heavy enough to resist floating during gas burst agitation of the developing solutions.

The upper deck of the film carrying rack contains a pair of serrated supporting strips 60 comparable to the supporting strips 50. Again, the supporting strips are joined by a handle 58. As shown in detail in FIGURE 8, to the bottom edge of each supporting strip 60 there is secured a strip 62 having downwardly directed slots 64 which overlie the upper edges of prints 52 in the lower deck of the film carrying rack. In lieu of providing two separate strips, slots 64 may be provided directly along the lower edge of supporting strip 60. A flexible tube 66 may be clamped to the outside of rack 20 to supply nitrogen for gas burst agitation. Tube 66 is connected to a pair of header conduits 68 in frame 54. A plurality of gas distribution lines 70 having apertures 72 extend between the header conduits for injecting gas evenly throughout the film carrying rack.

After immersion of the film carrying rack in the developing solution, it has been found that photographic prints may tend to float and slide upwardly within slots 48. This movement may also occur due to gas burst agitation of the developing solution by gas supplied through tube 66. Such movement of the prints within the lower deck is restricted by strip 62 and its slots 64. Upward movement of prints in the upper deck is restricted by a pair of web-like arms 74 extending across the top of the upper deck. Arms 74 have hinges 76 at one end thereof and have suitable hook-like members at the other end for frictionally engaging the opposite side wall 24. While arms 74 are illustrated as being web-like, it will be appreciated that the arms may also be in the form of rods, bars or the like.

Each of supporting strips 50 and 60 are adapted to be elevated within their respective vertical slots 56 so that the upper edges of the prints within the respective deck of the film rack may be accessible for ready removal. In FIGURE 5, the upper or elevated position of supporting strip 60 is shown in dot-dash lines. In the preferred embodiment, the supporting strips are maintained in the elevated position by friction rollers 78 which are concentric about handles 58. These friction rollers provide a simple and effective means for holding the supporting strips in their elevated position against wall 24.

In using the double-deck film carrying rack embodiment, it will be appreciated that prints 52 are initially inserted between beads 46 into the appropriate slots 48 in the lower deck before the two decks are joined to each other. After these prints are in position, the upper deck is placed upon the lower deck and secured thereto by catches 36. At this point, the upper edges of the film in the lower deck are received within slots 64. Additional prints are now loaded into the upper deck. Arms 74 are placed across the top of the rack, and the rack is ready for use. After the prints have been developed, the above steps are followed in reverse order to remove the prints from the rack.

FIGURE 10 illustrates a film carrying rack in accordance with another embodiment of the present invention. This embodiment has only one deck and substantially corresponds to the upper deck of the FIGURE 1 embodiment; accordingly, like reference numerals are utilized in these views.

FIGURE 11 illustrates another embodiment of the present invention which is basically similar to the FIGURE 10 embodiment, but is adapted for receiving larger size prints on the order of 8 x 10 inches. When larger prints are utilized, the vertical distance between beads 46 and the bottom support strip 50 is greater. Since the lower edges of the prints are unsupported throughout this distance during insertion, there is the possibility that the prints will become misaligned and two or more prints fall into the same serration in support strip 50. This would be disadvantageous since the prints would no longer be properly spaced, and the proper distribution of the developing solution around the films would be impeded. In order to avoid the aforementioned difficulties, a comb-like film guide member generally designated by reference numeral 80 extends through apertures provided in end walls 22''. This guide member includes a base member 82 having spaced bores 85 for receiving rods 84. As is clearly shown in FIGURE 11, rods 84 are inclined at an acute angle, and the rods of each guide member contact the bottom of the rack adjacent the middle thereof. Preferably, rods 84 have a cylindrical configuration. In any event, the configuration of rods 84 should be selected to guide the lower edges of the prints being inserted into the proper serrations in supporting strips 50.

In FIGURE 13, wherein one of the prints is shown in the process of being inserted, the relative positions of rods 84 and the serrations in strips 50 are clearly indicated.

FIGURE 14 illustrates that the guide member 80 may be retracted through the apertures in end walls 22''. After the film has been inserted, and the guide member has performed its function, it is then removed so as not to obstruct the flow and distribution of the developing solutions. It should be noted that the location of guide members 80 is determined by the characteristics of the film. In order to insure that the prints are properly aligned when completely inserted, the guide members should be located so that the lower edges of the prints pass between and/or contact rods 84 before any significant bending of the prints takes place.

The operation of the FIGURE 10 and FIGURE 11 embodiments is substantially the same as that described in connection with either one of the decks of the FIGURE 1 embodiment. However, in the FIGURE 11 embodiment, the guide members 80 are initially inserted into their operative positions before the carrying rack is loaded. These guide members may then be removed prior to immersing the carrying rack in a tank of developing solution.

Figure 16:
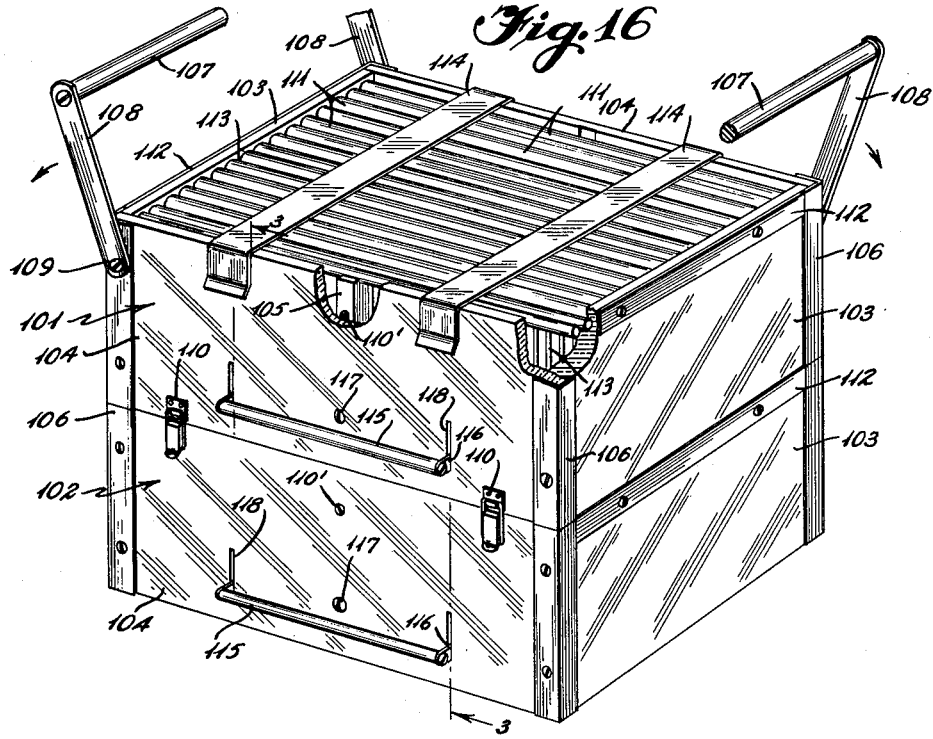
FIGURE 16 is a perspective view of a film carrying rack according to another embodiment of this invention.

Referring now to FIGURE 16, a tandem or double decker film carrying rack is illustrated which may be used for the treatment and carrying of relatively small standard size photographic film prints such as 2¼ x 3¼ inches, 4 x 5 inches, and the like. This tandem film carrying rack comprises substantially identical upper and lower sections 101 and 102, respectively, and each section has substantially identical right and left film carrying compartments. Thus, four such compartments are contained in the tandem rack although many more such compartments may be provided if desired to accommodate larger or smaller film sizes.

The upper rack section (and the lower rack section) are comprised of transparent end plates 103, transparent side plates 104 and center plate 105. As an illustration, and not by way of limitation, side plates 104 may be 10⅝ inches in length and 4½ inches in height, and end plates 103 may be 6½ inches in length and 4½ inches in height. The length of plates 103 is equivalent to the inside width of the racks and may be varied as desired since the width of the racks is only a limitation on the number of prints that may be handled. These transparent plates or walls may be constructed from any sturdy, transparent material such as glass or any transparent synthetic stock material (normally supplied in ¼ and ½ inch thicknesses) such as polyvinyl chloride, polyvinylidene chloride (available under the trade name Saran), polyethylene and other polyolefins, polyamides (nylon), polyesters, acrylic resins and modified acrylic resins such as methyl methacrylate (available under the trade name Lucite). One-half inch thick flat polyvinyl chloride (PVC) stock is preferred for all end and center plates, however, and one-quarter inch thick flat PVC stock is preferred for all side plates. In accordance with this invention, end plates 103 and side plates 104 are held together by suitable angles or corner members 106 and suitably placed screws or bolts. Corner members 106 may be made of any suitable material but 20 gauge T316 stainless steel is preferred in terms of cost, availability, and chemical inertness.

Film carrying rack section 101 is provided with handles 107 to facilitate movement and carrying of the rack. Handles 107 may be constructed of metal or synthetic resinous materials as desired. Synthetic resinous materials, such as those defined above, are preferred, however, in the interest of cost, light weight, and chemical inertness. The handles may be solid, hollow or porous and may contain various fillers and pigments. As an illustration, and not by way of limitation, handles 107 may preferably be made from ½ inch diameter PVC stock and may be 7¹⁄₁₆ inches in length. Handles 107 are connected to rack section 101 and corner members 106 by means of handle supports 108. Suitable screws, rods or bolts 109 are employed, as illustrated, to connect the various members and to provide adjustable movement to the handles as indicated by the arrows, since it may be desirable to swing handles 107 out of the way to permit the loading and unloading of prints, stacking and storage of racks and immersion of the racks in various solutions. Handle supports 108 may be constructed of metal or other suitable sufficiently rigid material, and may be, by way of illustration, ½ inch in width and 3 inches (between centers) in length and preferably formed from 11 gauge T316 stainless steel. If desired, handles 107 may be rigid and stationary or readily detachable from rack section 101 by means of well-known frictional or spring-loaded male and female members.

As clearly shown, catches 110 serve to connect rack sections 101 and 102 to each other. Obviously, more sections may be suitably connected to facilitate the carrying of additional film. Racks of various sizes may be interconnected by means of such catches. It is also a feature of this invention to substitute other bolts, catches or clips for the catches 110. It is only necessary that the means employed provide a reasonably secure connection between rack sections 101 and 102 such that the lower rack section will not become loosened or disengaged while the tandem racks are immersed in a treating solution.

Plate 105 is located substantially at the center of rack section 101 to provide two compartments and is suitably fastened by means of securing elements 110' to the side walls 104. Other fastening means such as an adhesive coating may also be employed to secure the plate 105 to the rack side walls. Obviously, the location of plate 105 may be varied if it is desired to treat and handle film pieces of different widths. For this reason, plate 105 may be made adjustable. For general use, it is intended that the measurements of the carrying rack of this invention will correspond to standard photographic print sizes. Thus, plate 105 may be 6½ inches in width, 4¼ inches in height, and made from ½ inch stock. Ordinarily, the restraining action of slots 113 in wall 103, serrations in strip 116, and clamp 114 will be sufficient to restrain odd-size prints without the adjustment or relocation of plate 105.

Referring again to the location of walls 103 and 104, the same may be fastened together by means of screws or bolts, as illustrated. Alternatively, however, walls 103 and 104 and plate 105 may be molded as a single piece. The multiple piece construction illustrated, however, is desirable in the interests of cleaning the apparatus, replacement of damaged or worn parts, and ease and economy of shipment and storage.

In accordance with the instant invention, a series of rods 111 are disposed between end walls 103 and are contained in film carrying rack sections 101 and 102 in a manner hereinafter described in detail. The rods may be constructed from a transparent material and may be hollow, solid or porous. The material of construction may also contain various pigments and fillers if desired. The film guiding rods 111 are preferably transparent, however constructed from glass or the class of transparent synthetic resinous materials noted above. Clear Lucite of 5/16 inch diameter and 10⅝ inches in length is preferred, but it is only necessary that the material employed provide sufficient rigidity when the rack is assembled. Rods 111 extend through end walls 103 and are suitably positioned in spaced holes. The rods 111 are prevented from longitudinal movement through end walls 103 by means of holding bars or strips 112. The rods serve to support cut film prints and to guide and facilitate the loading of the film. End walls 103 and center plate 105 contain openings or slots 113 which are equal in size to the distances between rods 111. Slots 113 serve to frictionally support the edges of the film and may be 1/16 inch in width and 3/16 inch in depth in the case of 4 x 5 inch cut film, although these measurements are given by way of illustration only. The grooves or slots 113 should be large enough to readily accommodate and guide the loading of the film being handled, and also should be small enough to effect a straightening and holding action on the wet film prints.

During the wetting process, it has been found that photographic prints may tend to float and slide upwardly in the slots 113. This movement may also occur due to the gas burst agitation of the developing solution. To prevent any such unnecessary movement of the prints, film carrying rack section 101 has been suitably provided with removably mounted restraining clamps or clips 114 about 7 inches in length. The clips are suitably provided with ¼ inch flanges for ease of removal, and are preferably formed from 20 gauge T316 stainless steel.

Handles 115 connect bottom supporting strips 116 which are suitably provided with serrations, the bottoms of which are in registration with slots 113 and are adapted to support the lower edges of photographic prints that will be mounted in the film carrying rack. One-quarter inch O.D. clear Lucite tubing, 5 3/16 inches in length, is preferred for the handles 115.

Bottom supporting strips 116 may be made of metal or of a hard synthetic resinous substance. The material employed should be heavy enough to resist floating in gas-agitated developing solutions. For this reason, and for chemical inertness, 18 gauge T316 stainless steel is preferred.

The serrated supporting strips 116 are slidably mounted in slots 118 in side walls 104 to permit the raising of photographic prints and their subsequent removal from the film carrying rack. In order to permit ease of removal, strips 116 may be retained or locked in an upper position by the interengagement of handle 115 with round-headed bolt 117. Handle 115 and bolt 117 are preferably constructed of a synthetic resinous material, although other substances may be employed, and may be hollow, solid or porous, or contain various pigments or fillers. However, handle 115 is preferably hollow in order to conserve weight and provide resilience. The physical properties of the material chosen must be sufficient to provide the necessary elasticity, resilience, flexibility, lubricity and strength that is required to enable handle 115 to slidably contact bolt 117 and be lifted thereover to effect a locking relationship therebetween. The materials should also be substantially chemically inert. Suitable commercially available round-headed bolts constructed of a polyamide such as nylon are preferred inasmuch as they provide the necessary bearing surface to permit handle 115 to slide or snap thereover.

By employing film carrying racks in accordance with the present invention, prints are supported in the racks by peripheral edge contact only. Such limited contact, while providing adequate support for the prints, leaves the whole picture area of the prints open to contact with the developing and treating solutions, and also permits improved drainage and drying of the prints.

While this invention has been shown and described by several specific embodiments, it will be appreciated that the invention is not limited to the specific details shown and described. Accordingly, it is intended to encompass all such changes and modifications as fall within the scope and spirit of the appended claims.

What is claimed is:

1. A film carrying rack for processing photographic prints comprising a pair of side walls, a pair of end walls provided with means to support the edges of photographic prints, at least one of said end walls being provided with aperture means spaced above the lower ends of said walls, a removable film guide member extending through the aperture means in one of said end walls and adapted to guide the bottom edges of prints being inserted into the rack into proper alignment, said guide member comprising a base member adapted to abut the outside of said one end wall, and a plurality of rod members extending into the interior of the rack wherein said rod members have a longitudinal axis which lies along the plane of said prints and extend along a sufficient portion of the film surface to guide said prints.

2. A film carrying rack for processing photographic prints comprising a pair of side walls, a pair of end walls provided with vertical slots to support the edges of photographic prints, a plurality of rods extending between the upper edges of said end walls, said rods being disposed intermediate said slots, a plurality of spacer beads on said rods adapted to guide prints into said slots, each of said end walls being provided with aperture means spaced above the lower ends of said walls, a pair of removable, comb-like film guide members extending through the aperture means in each of said end walls and adapted to guide the bottom edges of prints being inserted into the rack into proper alignment, each of said comb-like guide members comprising a base member adapted to abut the outside of the respective end wall, and a plurality of rod members extending into said rack, said rod members being inclined at an acute angle to the bottom of said rack and terminating adjacent the bottom of said rack wherein said rod members have a longitudinal axis which lies along the plane of said prints and extend along a sufficient portion of the film surface to guide said prints.

3. A film carrying rack for processing photographic prints comprising a plurality of transparent end walls, a plurality of spaced transparent film guiding means supported at the upper portion of said end walls, a plurality of transparent side walls, a plurality of photographic print bottom supports movably mounted in said side walls, each print bottom support including a member parallel to said end walls and provided with serrations which are aligned with the spaces between said guiding means, said film carrying rack having a substantially open bottom structure to permit better fluid contact and better drainage, and means to elevate said bottom supports to raise portions of the prints out of the carrying rack.

4. A film carrying rack according to claim 3 wherein said film guiding means comprise rods and a plurality of spacer members distributed along said rods.

5. A film carrying rack according to claim 3 wherein said film guiding means comprise rods and a plurality of spacer beads distributed along said rods.

6. A film carrying rack according to claim 3 wherein said film guiding means comprise rods.

7. A film carrying rack according to claim 3 wherein said film guiding means are slidably mounted in said end walls.

8. A film carrying rack according to claim 7 further including a member adapted to restrain said slidably mounted film guiding means from passing through said end walls.

9. A film carrying rack for processing photographic prints comprising a plurality of transparent side walls, a plurality of transparent end walls provided with vertical slots to support photographic prints by their edges, a plurality of spaced transparent film guiding means, said end walls being provided with grooves at their upper edges to support said film guiding means, the spaces between said guiding means being aligned with said vertical slots, and a movably mounted photographic print bottom support to assist in removal of the prints, including members parallel to said end walls, each of said members being provided with serrations which are aligned with said vertical slots.

10. A film carrying rack according to claim 9 wherein said film guiding means comprise rods and a plurality of spacer members distributed along said rods.

11. A film carrying rack according to claim 9 wherein said film guiding means comprise rods and a plurality of spacer beads distributed along said rods.

12. A film carrying rack according to claim 9 wherein said film guiding means comprise rods.

13. A film carrying rack according to claim 9 wherein said rack is provided at its lower edges with a plurality of clamps to permit the carrying of at least one similar rack beneath said first-mentioned rack.

14. A film carrying rack according to claim 9 wherein said movably mounted photographic print bottom support comprises downwardly directed serrations adapted to overlie the upper edges of prints in said similar rack beneath said first-mentioned rack.

15. A film carrying rack according to claim 9 wherein said movably mounted photographic print bottom support is provided with a handle, the ends of which extend through said side walls and which is adapted to raise and lower said print bottom support.

16. A film carrying rack for processing photographic prints or films comprising a pair of side walls, a pair of end walls provided with vertical slots to support the edges of photographic prints, at least one of said walls being transparent, a plurality of essentially transparent, spaced film guiding means, the spaces between said giuding means being aligned with said vertical slots, each of said side walls being provided with essentially vertically extending apertures therein, an adjustable film bottom support within said rack adjacent thereof, including members parallel to said end walls, and provided with a handle, the ends of which extend through said apertures for raising and lowering said film bottom support.

17. A film carrying rack according to claim 16 wherein said film guiding means comprise rods and a plurality of spacer members distributed along said rods.

18. A film carrying rack for processing photographic prints comprising a plurality of transparent side walls, a plurality of transparent end walls containing a plurality of equally spaced and vertically extending slots to support photographic prints by their edges, a plurality of transparent film guiding means supported by said end walls and aligned with said slots, a plurality of photographic print bottom supports movably mounted in said side walls, each print bottom support comprising a member parallel to said end walls and provided with serrations which are aligned with said vertically extending slots, and means to elevate said bottom supports to raise portions of the prints out of the carrying rack, said film carrying rack having a substantially open bottom structure.

19. A film carrying rack according to claim 18 wherein said film guiding means comprise rods and a plurality of spacer members distributed along said rods.

20. A film carrying rack according to claim 19 including at least one removable clip mounted on said film carrying rack and adapted to restrain photographic prints at their upper edges.

21. A film carrying rack for processing photographic prints comprising end walls provided with a plurality of vertically extending photographic print edge supporting slots, a plurality of spaced transparent film guiding means mounted in said end walls, side walls having essentially vertically extending apertures passing therethrough, at least two of the above-mentioned walls being transparent, adjustable bottom film support means to assist in removal of the prints, said support means having portions thereof movable within said apertures, and including a member parallel to said end walls and provided with serrations which are aligned with said slots, and at least one additional wall positioned parallel to said end walls, said side walls, end walls and additional wall defining at least two substantially film carrying compartments.

22. A film carrying rack according to claim 21 wherein said film guiding means comprise rods and a plurality of spacer members distributed along said rods.

23. A film carrying rack according to claim 21 wherein said additional wall is adapted to provide additional support for said film guiding means, said additional wall containing vertically extending photographic print edge supporting slots on at least one face thereof.

24. A film carrying rack for processing photographic prints comprising a pair of end walls, a pair of side walls, at least one of said walls being transparent, a plurality of transparent film guiding means supported by said end walls, a locking means positioned on said side walls, and a movably mounted photographic print bottom support positioned adjacent to said locking means and adapted to slidably enter into locking engagement therewith, said bottom support being adapted to be elevated to assist in the removal of the prints.

25. A film carrying rack according to claim 24 wherein said film guiding means comprise rods and a plurality of spacer members distributed along said rods.

26. A film carrying rack according to claim 24 wherein said locking means comprise a round headed bolt.

27. A film carrying rack according to claim 24 wherein said movably mounted bottom support comprises at least one serrated photographic print supporting strip connected to at least one flexible handle, said flexible handle being adapted to slidably enter into locking engagement with said locking means.

28. A film carrying rack for processing photographic prints comprising a pair of end walls, a pair of side walls, at least one of said walls being transparent, a plurality of transparent film guiding means supported by said end walls, a movably mounted photographic bottom support, a locking means positioned on said bottom support and including friction roller means engaging the outside of said side walls, and said bottom support being adapted to be elevated to assist in the removal of the prints.

References Cited in the file of this patent

UNITED STATES PATENTS

| | | |
|---|---|---|
| 276,875 | Price | May 1, 1883 |
| 1,140,005 | Schverma | May 18, 1915 |
| 1,349,972 | MacDowell | Aug. 17, 1920 |
| 1,524,444 | Malia | Jan. 27, 1925 |
| 2,340,595 | Jones | Feb. 1, 1944 |
| 2,369,335 | Burman | Feb. 13, 1945 |
| 2,601,426 | Bauman | June 24, 1952 |
| 2,845,852 | Parker | Aug. 5, 1958 |
| 2,892,393 | Hixon et al. | June 30, 1959 |
| 3,000,289 | Horiuchi | Sept. 19, 1961 |

FOREIGN PATENTS

| | | |
|---|---|---|
| 764,020 | France | Feb. 26, 1934 |